United States Patent
Kirn et al.

[11] Patent Number: 6,059,493
[45] Date of Patent: May 9, 2000

[54] MANUAL MACHINE TOOL WITH TOOL HOLDER AND APPROPRIATE TOOL

[75] Inventors: Manfred Kirn, Stuttgart; Ernst Kraenzler; Klaus Klingenstein, both of Leinfelden-Echterdingen; Ernst Dreher, Reutlingen; Gerd Hahn; David Matzo, both of Leinfelden-Echterdingen; Joerg Ullrich, Dettenhausen; Joerg Dehde, Steinenbronn; Karl Garatwa, Reutlingen; Joachim Schadow, Stuttgart; Christian Hermes, Weil im Schoenbuch; Joerg Moessner, Birkenfeld, all of Germany

[73] Assignee: Robert Bosch GmbH, Stuttgart, Germany

[21] Appl. No.: 09/043,805

[22] PCT Filed: Oct. 4, 1996

[86] PCT No.: PCT/DE96/01912

§ 371 Date: Jun. 17, 1998

§ 102(e) Date: Jun. 17, 1998

[87] PCT Pub. No.: WO97/13607

PCT Pub. Date: Apr. 17, 1997

[30] Foreign Application Priority Data

Oct. 6, 1995 [DE] Germany ............................ 195 37 117
Aug. 21, 1996 [DE] Germany ............................ 196 33 677

[51] Int. Cl.[7] .................................................. B23B 31/103
[52] U.S. Cl. ........................... 408/226; 279/23.1; 279/76; 279/78; 279/80; 279/906; 279/907; 408/239 R
[58] Field of Search .................................... 279/19.1, 23.1, 279/79, 102, 75, 46.1, 76, 907, 80, 35–40, 77, 78, 906; 408/231, 226, 239 R, 240

[56] References Cited

U.S. PATENT DOCUMENTS

| | | |
|---|---|---|
| 656,357 | 8/1900 | Kramer ...................................... 279/37 |
| 1,154,642 | 9/1915 | Lawton ..................................... 279/907 |
| 1,422,058 | 7/1922 | Hovanec . | 
| 1,929,869 | 10/1933 | Haessner . |
| 2,279,310 | 4/1942 | Grey .......................................... 279/78 |
| 3,153,434 | 10/1964 | Shimokawa ............................... 82/153 |
| 3,837,687 | 9/1974 | Leonard .................................... 279/907 |
| 4,787,278 | 11/1988 | Bononi ...................................... 81/438 |
| 5,199,833 | 4/1993 | Fehrle et al. .......................... 408/239 R |
| 5,326,199 | 7/1994 | Kleine et al. ............................ 408/226 |
| 5,335,409 | 8/1994 | Elvebak .................................... 81/438 |
| 5,826,888 | 10/1998 | Weaver et al. .......................... 279/23.1 |

FOREIGN PATENT DOCUMENTS

0 525 560 A2  2/1993  European Pat. Off. .
0 526 783 A1  2/1993  European Pat. Off. .
644 516 A5  3/1988  Switzerland .

*Primary Examiner*—Steven C. Bishop
*Attorney, Agent, or Firm*—Michael J. Striker

[57] ABSTRACT

The hand-held machine tool has a tool holder (20) provided with a receptacle (19) into which a shaft portion (15) of a tool (16) is axially insertable. The tool holder (20) has a longitudinal axis (11) and includes a guide device (18) for axially guiding the tool (16); a device (23) for rotary slaving of the tool (16); a retaining device (28) for axially securing the tool (16) and a locking member (34) for locking the retaining device (28) in an open configuration for insertion or removal of the tool (16). The retaining device (28) is located in front of the guide device in an insertion direction of the tool (16) in the tool holder (16). The retaining device (28) is provided with an opening (31) for passage of the tool (16) through it. The retaining device (28) includes a clamping part (30) having an open position arranged approximately perpendicular to the longitudinal axis (11) and is pivotable out of the open position in a direction toward the longitudinal axis (11) to reduce an effective cross-section of the opening (31) and into a clamping position in which the clamping part (30) and the tool (16) are clamped together.

31 Claims, 5 Drawing Sheets

MANUAL MACHINE TOOL WITH TOOL HOLDER AND APPROPRIATE TOOL

BACKGROUND OF THE INVENTION

1. Field of the Invention

The invention relates to a hand-held machine tool, particularly for drilling, screwing, brushing, grinding or the like, having a tool holder that has a receptacle into which a shaft portion of a tool is axially inserted and that is provided with guide means for guiding the tool axially, with means for rotationally slaving the tool and with retaining means for axially securing the tool. The invention also relates a tool for the hand-held machine tool, especially for drilling, screwing, brushing, grinding or the like, which is driven rotationally about its longitudinal axis and has a tool shaft including the shaft portion for axially guiding the tool, a region for rotary slaving of the tool and a retaining portion for axially fixing the tool.

2. Prior Art

A hand-held machine tool is already known (German Patent DE 25 51 125 C2), which has a tool holder for receiving a tool. The rotary slaving of the tool is effected via rotary slaving cleats on the tool holder, which engage corresponding rotary slaving grooves in the tool shaft. The tool is secured in the axial direction by releasable locking bodies of the tool holder, which engage corresponding recesses in the tool shaft that are closed on both ends axially. The means for the rotary slaving of the tool and the means for the axial fixation of the tool are disposed axially in the region of the receiving opening. This does have the advantage that an axially relatively short tool holder and a correspondingly short tool shaft can be achieved. However, because of the axial superposition of the individual functional regions, a compromise must be made in the properties of the tool shaft, for production reasons. The demand for a sturdy, wear-resistant rotary slaving region which must therefore be hardened stands in the way of making a guide region with close tolerances and thus with very great dimensional precision, so that good concentricity properties can be achieved.

Jaw liners for retaining a tool are also known. To achieve good concentricity properties, the lined jaws must receive the tool centrally to the drilling spindle at all times, regardless of the shaft diameter of the tool, which entails major production effort and expense. Inserting the tool into a drilling chuck also proves to be relatively complicated, since the drilling chuck must first be opened and then the lined jaw must be clamped together with the tool. Automatic insertion locking is not possible.

SUMMARY OF THE INVENTION

It is an object of the present invention to provide an improved hand-held machine tool, particularly for drilling, screwing, brushing, grinding or the like, of the above-described kind and an improved tool of the above-described kind, which does not have the above-described disadvantages.

According to the invention a hand-held machine tool is provided having a tool holder with a receptacle into which a tool shaft of a tool is axially insertable. The tool holder has a longitudinal axis and comprises guide means for axially guiding the tool; means for rotary slaving the tool; retaining means for axially securing the tool, which is located in front of the guide means in an insertion direction of the tool in the tool holder, wherein the retaining means is provided with an opening for passage therethrough of the tool and comprises a clamping part having an open position arranged approximately perpendicular to the longitudinal axis, which is pivotable out of the open position in a direction toward the longitudinal axis to reduce an effective cross-section of the opening and into a clamping position in which the clamping part and the tool are clamped together, and a locking member for locking the clamping part in the open position for insertion or removal of the tool.

According to the invention the tool for the hand-held machine tool has a longitudinal axis and comprises a tool shaft. The tool shaft includes a guiding shaft portion for axially guiding the tool, a rotary slaving region for rotary slaving the tool and a retaining shaft portion for axially fixing the tool. The tool shaft has a shaft portion of comparatively smaller diameter and another shaft portion of comparatively larger diameter and the retaining shaft portion is arranged in front of the another shaft portion in an insertion direction of the tool in the hand-held machine tool.

The tool holder according to the invention, and the tool of the invention, have the advantage over the prior art of enabling high guidance accuracy of the tool holder and the tool, with a simple design of the tool holder and a tool that can be manufactured simply and economically. Moreover, the design of the tool holder allows the provision of an automatic axial locking upon insertion of the tool into the tool holder.

By means of the provisions recited in the dependent claims, advantageous refinements of the hand-held machine tool according to the invention and the tool according to the invention are possible.

BRIEF DESCRIPTION OF THE DRAWING

Four exemplary embodiments of the invention are shown in the drawing and described in further detail in the ensuing description.

DESCRIPTION OF THE PREFERRED EMBODIMENTS

Figure 1:
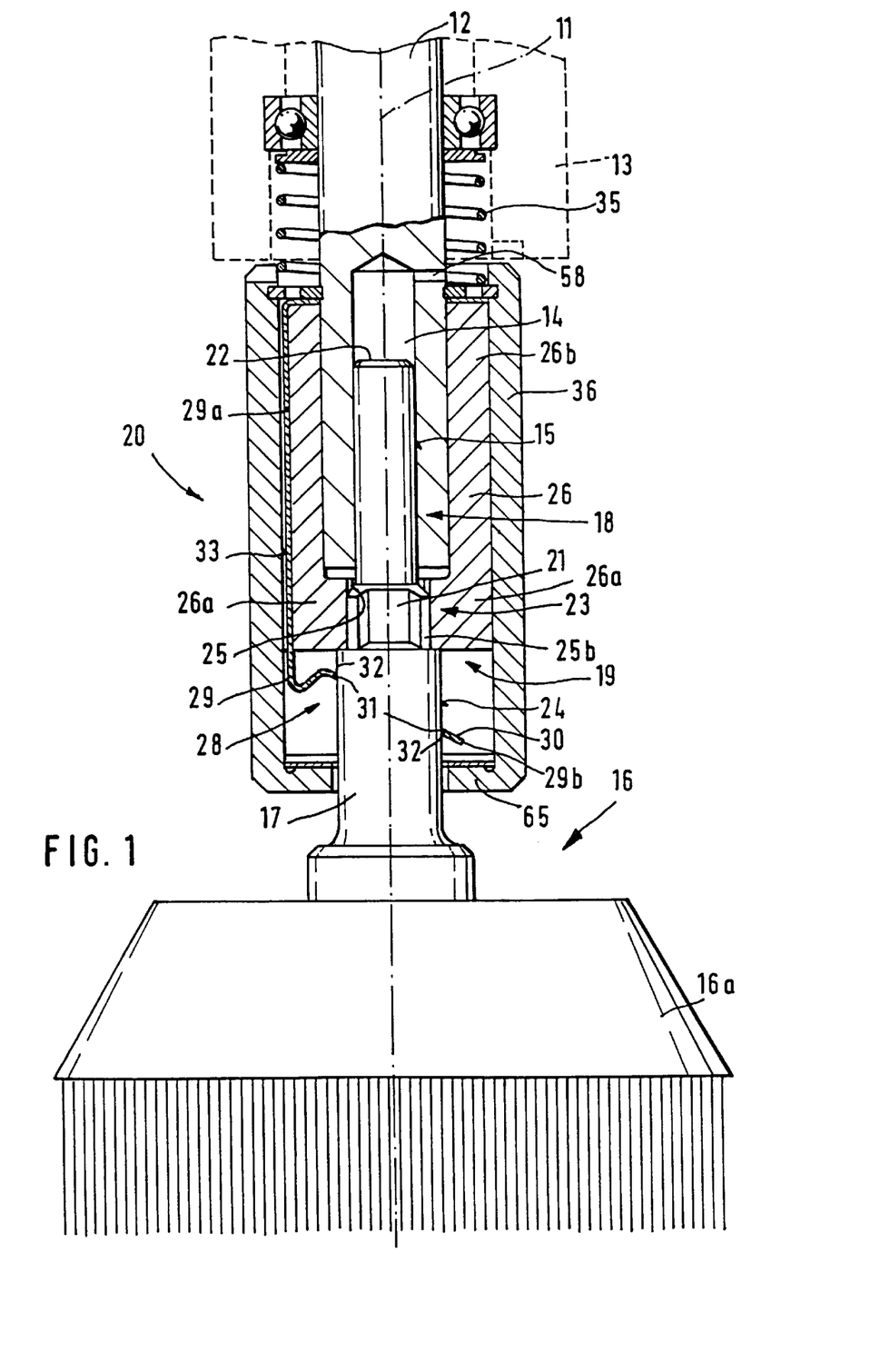
FIG. 1 is a longitudinal section through a tool holder of a hand-held machine tool with a tool inserted into it.

In FIG. 1, the part of the hand-held machine tool engaged with the tool is shown. The hand-held machine tool has a spindle 12, which can be driven to rotate about a longitudinal axis 11 and which protrudes from a housing 13 of the hand-held machine tool. Located concentrically in the spindle 12 is an axial guide bore 14, which serves to receive and guide a cylindrical shaft portion 15 of a tool 16. In this example, the tool 16 is embodied as a brush 16a. However, it may be some other tool with a rotary drive-motion, such as a drilling, screwing or grinding tool.

The guide bore 14 forms a guide means 18 for axially guiding the shaft portion 15 and is part of a receptacle 19 of a tool holder 20 for retaining the tool 16. The tool 16 is provided with a tool shaft 17, which can be inserted into the receptacle 19. The shaft portion 15 is embodied on an insertion end 22 of the tool 16. On the tool side, the guide bore 14 is axially adjoined by a region 21 for rotary slaving of the tool 16, in which corresponding rotary slaving means 23 are embodied. A sleeve 26 is seated on the spindle 12; it is mounted on the spindle 12 with a rear portion 26b and connected to the spindle in a manner fixed against relative rotation. On the tool side, the sleeve 26 protrudes outward beyond the spindle 12; a rotary slaving profile 25, such as a set of teeth or a polygonal profile, is embodied on the inside of the part 26a of the sleeve 26 that protrudes past the spindle 12, and this profile cooperates form-lockingly with a corresponding counterpart profile 25b on the tool shaft 17.

The rotary slaving region 21 is adjoined axially by a retaining portion 24 for axially securing the tool 16 against falling out or being unintentionally pulled out of the guide bore 14. Acting as a retaining means 28 in this retaining portion 24 is a sheet-metal spring 29, with an angled free end 29b that is located obliquely, that is, tilted relative to the longitudinal axis 11 and forms a clamping part 30. The clamping part 30 has an opening 31, through which a cylindrical portion of the tool shaft 17 protrudes. The clamping part 30 is pivotable to the longitudinal axis 11, which at the same time forms the pivot axis of the tool 16. In this way, the effective cross section of the opening 31 can be varied.

The sheet-metal spring 29 is connected by one end 29a to the sleeve 26 in an axially and rotationally fixed manner. The fixation of the sheet-metal spring 29 in a manner proof against relative rotation is effected by engagement with a longitudinal groove 33 in the sleeve 26. The angled clamping part 30 of the sheet-metal spring 29 is resiliently prestressed in the direction of the longitudinal axis 11, so that the retaining portion 24 of the tool shaft 17 clamps together with an edge 32 of the opening 31. If in the clamping position the tool 14 is pulled a little way out of the receiving opening 14, then the clamping force is reinforced even further; in other words, self-locking takes place.

An actuation sleeve 36 encompasses the tool holder 20 and is axially displaceably supported relative to the spindle 12. By pushing back the actuation sleeve 36, which is prestressed in the direction of the tool 16 by means of a spring 35, the actuation sleeve 36 is moved with its front face end 65 toward the clamping part 30, which it presses resiliently into a more vertical position relative to the longitudinal axis 11; the opening 31 then has a larger effective cross section relative to the retaining portion 24, so that the clamping action between the clamping part 30 and the tool 16 is discontinued. The tool shaft 17 can then be taken out of the receptacle 19.

Figure 2:
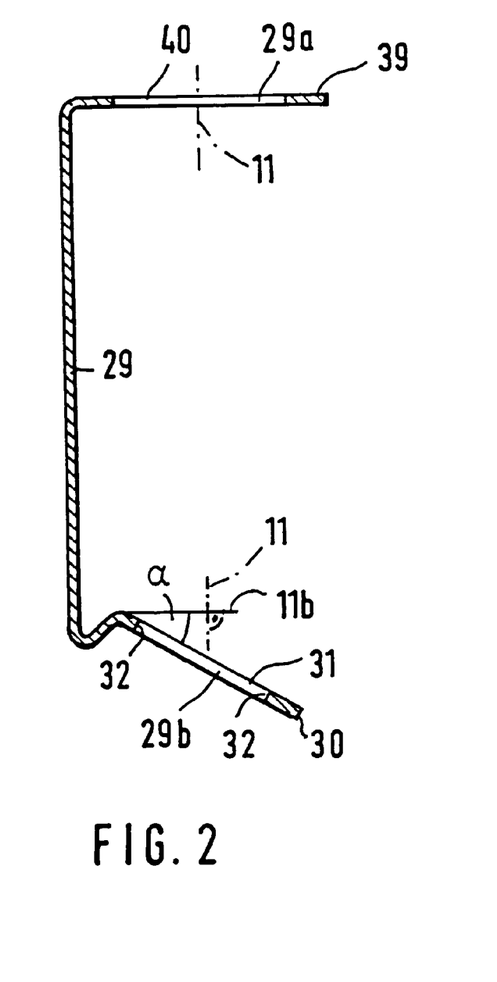
FIG. 2 is a longitudinal section through a sheet-metal spring of the tool holder.
Figure 3:
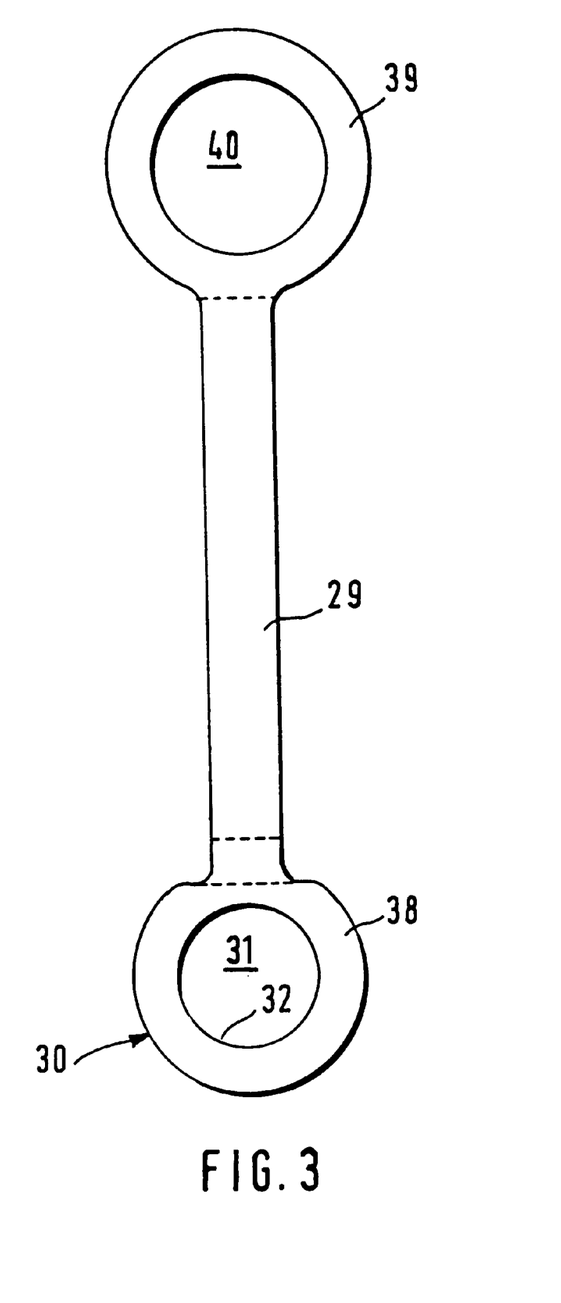
FIG. 3 is a front view of the sheet-metal spring.

In FIGS. 2 and 3, the sheet-metal spring 29 is shown. As can be seen from the developed view of FIG. 3, circular laminations 38, 39 are formed onto each end of the sheet metal spring 29. A first circular lamination 38 forms the clamping part 30 with the opening 31; a second circular lamination 39 is angled perpendicular to the longitudinal axis 11 (FIG. 2) on the rear end 29a of the sheet-metal spring 29 and serves the purpose of axially fixing the sheet metal spring 29 to the tool holder 20. A hole 40 through which the spindle 12 can pass is provided in this circular lamination 39.

In this example, the opening 31 is cylindrical, with a larger radius than the radius of the tool shaft 17 in the retaining portion 24. However, the opening 31 may also be elliptical. The cross section of the opening 31 that is definitive for the clamping action between the clamping part 30 and the tool 16 decreases with the cosine of a pivot angle a of the clamping part 30, which is measured from the vertical 11b to the longitudinal axis 11. As soon as the effective cross section of the opening 31, measured transversely to the longitudinal axis 11. Corresponding to the diameter of the retaining portion 24, a clamping action ensues between the edge 32 of the opening 31 and the tool 16. A clamping action solely on the right-hand side of the shaft 17 may possibly suffice.

Figure 4:
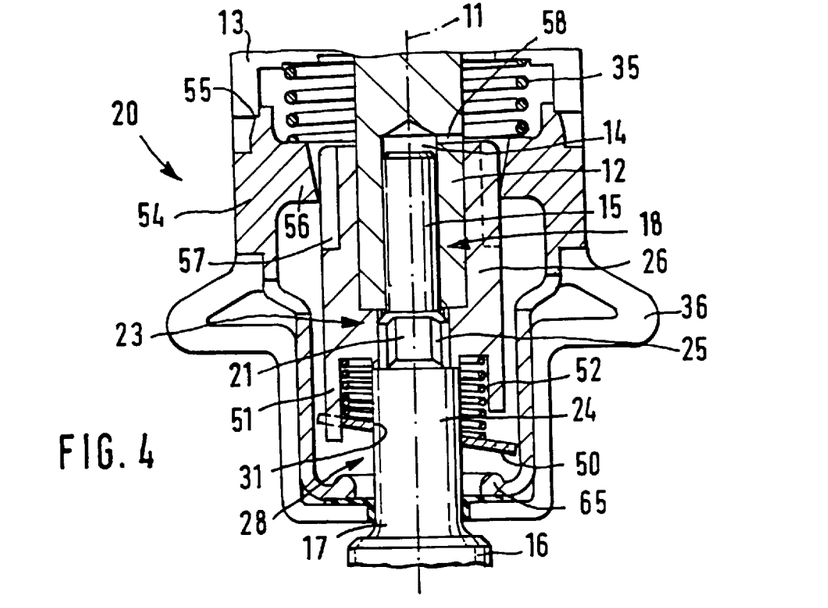
FIG. 4 is a longitudinal section through a tool holder in accordance with a second exemplary embodiment.

In FIG. 4, a second exemplary embodiment of a tool holder 20 is shown. Elements that are the same and function the same are identified by the same reference numerals, and this is also the case for all the other exemplary embodiments. The essential distinction from the preceding first exemplary embodiment is that a disk 50 is provided, instead of a sheet-metal spring with a clamping part. The disk 50 is pivotably connected on one end to a protrusion 51 of the sleeve 26. The disk 50 likewise has an opening 31, whose effective cross section can be varied by swiveling the disk 50.

A compression spring 52 is clamped between the sleeve 26 and the disk 50, concentrically with the tool shaft 17. Because of the articulated support of the disk 50, the compression spring 52 causes pivoting of the disk 50 toward the tool 16 in the direction of a decrease in size of the effective cross section of the opening 31, and as a result the disk 50 is clamped together with the retaining portion 24 of the tool 16.

By means of an axial displacement of the actuating sleeve 36 toward the rear, the disk 50 is righted by the face end 65 of the actuating sleeve 36. The effective cross section of the opening 31 increases in this process, so that the tool 16 is then axially released, thereby unclamping it from the disk 50. To prevent an unintentional release of the tool 16, a portion of the actuating sleeve 36 that is embodied as a pushbutton 54 must first be pressed radially inward, thereby releases a blocking face 55. Only then can the actuating sleeve 36 be displaced axially rearward. The pushbutton 54 can be moved inward in turn only whenever a tooth 56 is opposite a corresponding groove 57 in the sleeve 26 (left-hand half of the sectional view in FIG. 5) in such a way that it can engage the groove 57. In the non-depressed position, the actuating sleeve 36 is axially nondisplaceable, so that at the same time the actuating sleeve 36 performs the function of a housing part.

Figure 5:
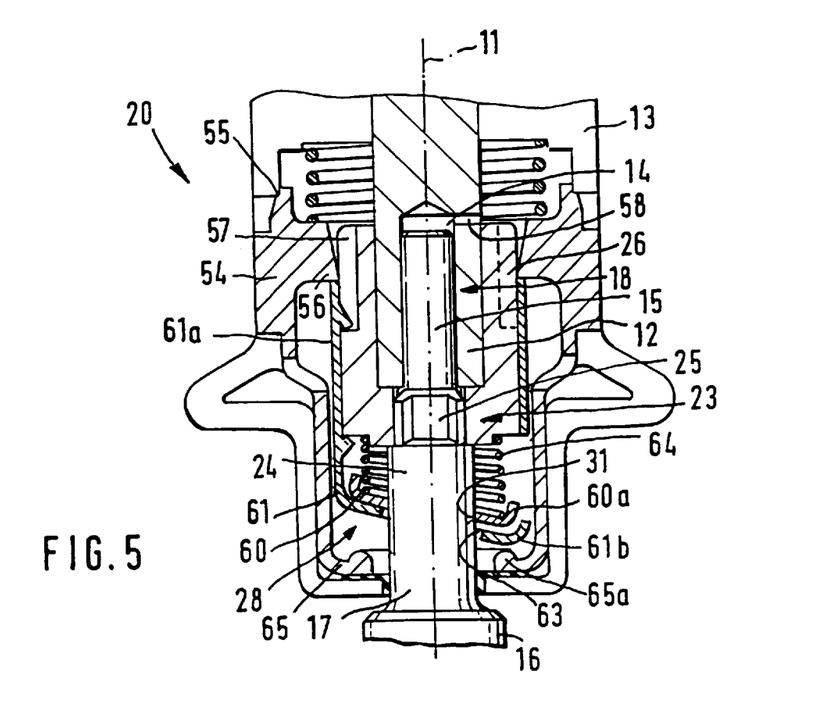
FIG. 5 is a longitudinal section through a tool holder in accordance with a third exemplary embodiment.

In FIG. 5, a third exemplary embodiment of a tool holder 20 is shown. Compared with the second exemplary embodiment of FIG. 4, this tool holder 20 differs only in terms of the retaining means 28, which include a connecting disk 60 that rests on one side on a bracket 61. The bracket 61 is connected by a part 61a to the sleeve 26 in a rotationally and axially fixed manner. It has an angled retaining part 61b, which is provided with a through opening 63 for the retaining portion 24 of the tool shaft 17, which passes with major play through the through opening 63. The connecting disk 60 is provided with the opening 31, which when the connecting disk 60 is in a tilted position effects the axial fixation of the tool 60. The connecting disk 60 is pressed by a spring 64 against the retaining part 61b of the bracket 61. Because of the tilted position of the retaining part 61b relative to the longitudinal axis 11, the connecting disk 60 rests on one side on the retaining part 61b. One free end 60a of the connecting disk 60 is then pressed by the spring 64 in the direction of the clamping position of the connecting disk 60 with the tool 16.

Once again, the clamping action can be discontinued, if the actuating sleeve 36 is displaced axially rearward. This is possible whenever the tooth 56, as a result of a depression of the pushbutton 54, engages the groove 57 and the blocking face 55 is released relative to the housing 13. A slaving part 65a on the front face end 65 of the actuating sleeve 36 then—as in the above-described embodiments as well—effects the swiveling of the connecting disk 60 in the sense of undoing the clamping between the connecting disk 60 and the tool 16. Pushing back the actuating sleeve 36 causes the slaving part 65a initially to contact the retaining part 61b, which is embodied resiliently. As the actuating sleeve 36 is pushed further back, the retaining part 61b comes to assume a position that is more vertical to the longitudinal axis 11; the connecting disk 60, pressed against the retaining part 61b by spring 64, is likewise righted, causing the undoing of the clamping to the tool 16.

All three exemplary embodiments share the feature of automatic locking of the tool 16 upon insertion into the tool holder 20. When the tool 16 is inserted, first the retaining portion 15 is inserted some distance into the guide bore 14. Next, the slaving profile 25 is put into the correct rotational position, thus enabling the tool shaft 17 to be pushed farther into the tool holder 20. The guide bore 14 has an equalization opening 58, which makes a pressure equilibrium easier upon insertion and removal of the tool 16.

As the tool shaft 17 is inserted farther, the clamping member 30 is pivoted by the shaft portion 24 in the direction of its release position with the greater definitive cross section of the opening 31, so that the hub 28 no longer blocks it.

Figure 6:
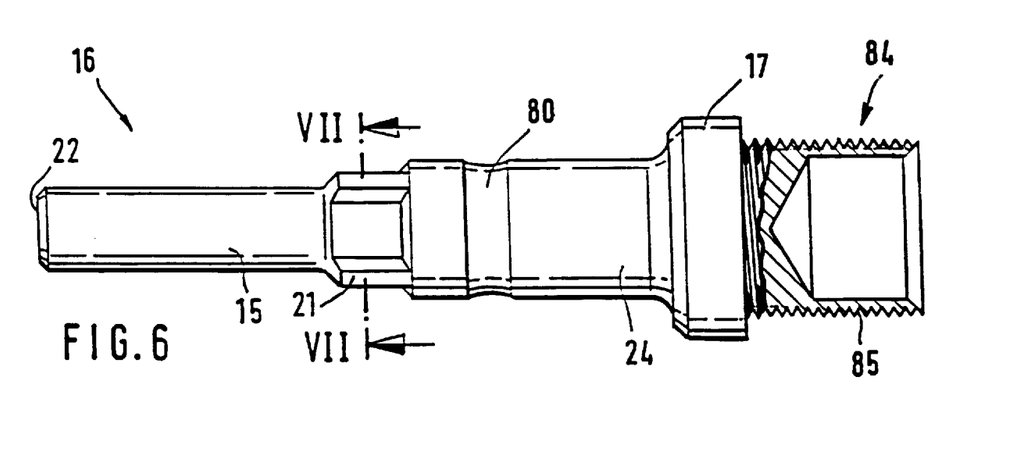
FIG. 6 is a partially side, partially sectional view through a tool.

In FIG. 6 the tool shaft 17 of the tool 16 is shown. The axially successive regions can be seen, that is, the shaft portion 15 for axial guidance, the rotary slaving region 21, and the retaining portion 24. The guide bores 15, like the retaining portion 24, is shaped cylindrically. The retaining portion 24 may be provided with indentations, such as an annular groove 80, as well. In FIG. 6 the tool shaft 17 is embodied as an adapter 84, to which the tool 16 of FIG. 1 can be releasably attached by means of a thread 85.

Figure 7:
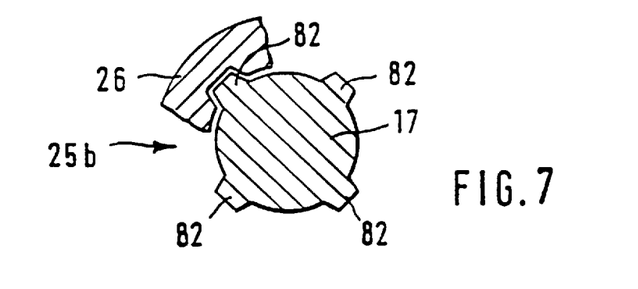
FIG. 7 is a cross section through the tool along the line XII—XII of FIG. 6.

The counterpart profile 25b of the rotary slaving region 21 can be seen in FIG. 7. A total of four protrusions 82 distributed over the outer circumference are provided, and they can be inserted into complementary grooves embodied in the sleeve 26.

Figure 8:
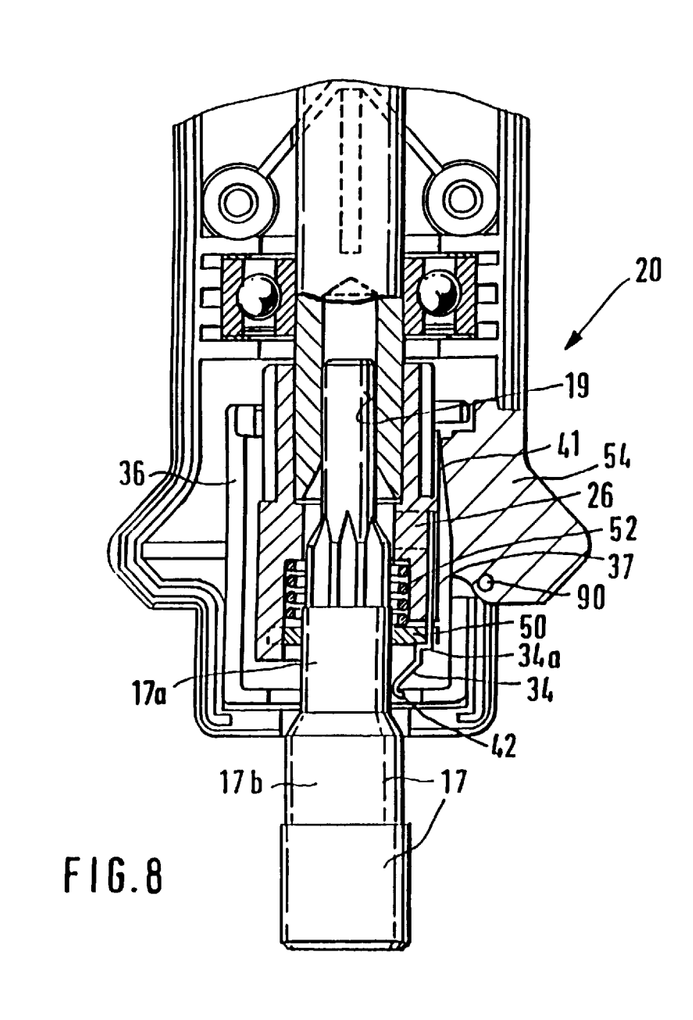
FIGS. 8 and 9 are each a longitudinal section through a tool holder in accordance with a fourth exemplary embodiment.
Figure 9:
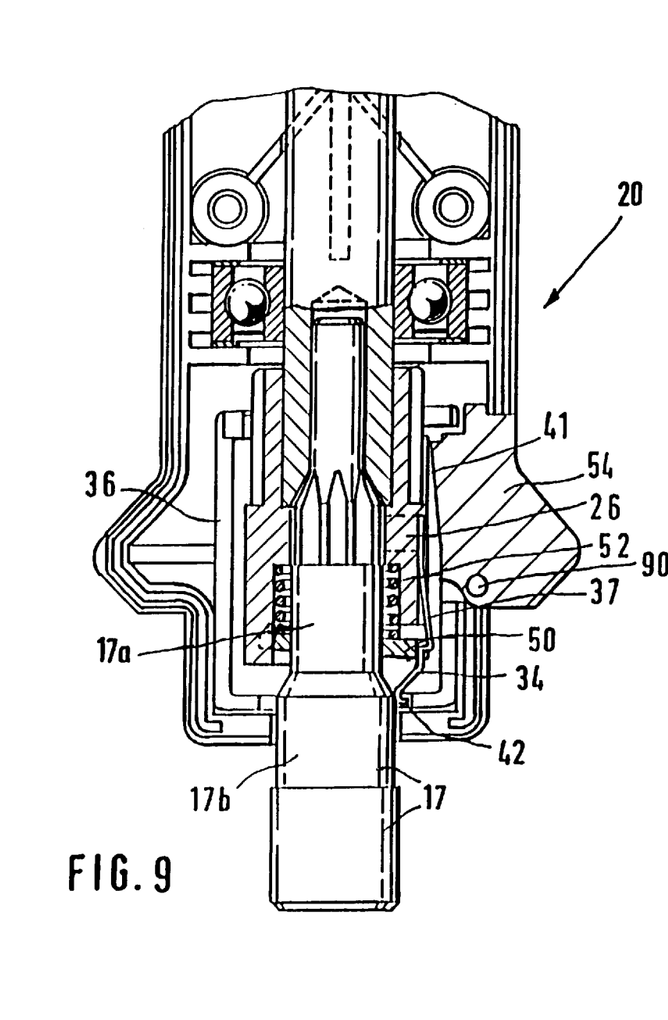

In FIGS. 8 and 9, a fourth exemplary embodiment of the invention is shown. It differs from the embodiment shown in FIG. 4 in that the disk 50, with the aid of a locking member 34, can be locked in its release position (see FIG. 8) for the sake of nonclamping insertion and removal of the tool 16.

The locking member 34 comprises a bracket 37, which is secured by one end 41 to the sleeve 26 of the tool holder 20. Approximately in its middle, the bracket 37 has a right-angle bend 34a, with which it engages the disk 50 from behind and keeps it approximately perpendicular to the longitudinal axis 11. The free end 42 of the bracket 37 is supported on the shaft 17 of the tool 16 to be inserted into the receptacle 19.

The shaft 17 is graduated and on its end has one portion 17a of smaller diameter and adjoining it a portion 17b of larger diameter. As long as the free end 42 of the bracket 37 is supported on the first portion 17a during the insertion of the tool 16, the disk 50 remains locked in its opening position. Once the tool 16 has been inserted all the way into the receptacle 19, the free end 42 is shifted outward by the second portion 17b, and the bracket 37 releases the disk 50 (see FIG. 9). The disk 50 is then put in a tilted position by the compression spring 52 and in this way clamped to the shaft 17.

For releasing the tool 16, the pushbutton 54 is pressed in, analogously to the second exemplary embodiment of FIG. 4, so that the actuating sleeve 36 can be displaced axially rearward. The pushbutton 54 is coupled to the actuating sleeve 36 via a joint 90. Via a protrusion, not shown in detail in FIGS. 8 and 9, on the actuating sleeve, the disk 50 can be righted into its opening position. The right-angle bend 34a of the bracket 37, the bracket being prestressed inward, finds a detent in the opening position in front of the disk 50 and locks the disk.

What is claimed is:

1. A hand-held machine tool having a tool holder (20) provided with a receptacle (19) into which a shaft portion (15) of a tool (16) is axially insertable, said tool holder (20) having a longitudinal axis (11) and comprising guide means (18) for axially guiding the tool (16);

means (23) for rotary slaving the tool (16);

retaining means (28) for axially securing the tool (16), said retaining means (28) being located in front of said guide means in an insertion direction of the tool (16) in the tool holder (16), wherein said retaining means (28) is provided with an opening (31) for passage therethrough of the tool (16), said retaining means (28) comprises a clamping part (30) having an open position arranged approximately perpendicular to the longitudinal axis (11) and said clamping part (30) is pivotable out of the open position in a direction toward the longitudinal axis (11) to reduce an effective cross-section of said opening (31) and into a clamping position in which the clamping part (30) and the tool (16) are clamped together; and a locking member (34) for locking the clamping part (30) in the open position for insertion or removal of said tool (16).

2. The hand-held machine tool as defined in claim 1, wherein the means (23) for rotary slaving the tool (16) and the retaining means (28) for axially securing the tool (16) are arranged axially one after the other.

3. The hand-held machine tool as defined in claim 1, wherein the retaining means (28) is located axially preceding the means (23) for rotary slaving.

4. The hand-held machine tool as defined in claim 3, further comprising a spindle (12) rotatable about the longitudinal axis (11) and wherein said means for rotary slaving comprises a spindle sleeve (26) having a rear portion (26b) and said rear portion is arranged on the spindle (12) and fixed to prevent rotation of the spindle sleeve (26) relative to the spindle (12).

5. The hand-held machine tool as defined in claim 4, wherein said guide means (18) is formed by a guide bore (14) provide in said spindle (12) and said guide bore (14) is coaxial with said spindle (12).

6. The hand-held machine tool as defined in claim 1, wherein the clamping part (30) comprises a sheet-metal spring (29) having one end (29a) secured to the tool holder (20) and another end (29b) arranged at an oblique angle to the longitudinal axis (11) and said another end (29b) of the sheet-metal spring (29) is resiliently pre-stressed in a direction toward said clamping position.

7. The hand-held machine tool as defined in claim 4, wherein said retaining means (28) includes a compression spring (52) and the clamping part (30) comprises a disk (50), said spindle sleeve (26) has a protrusion (51) and is pivotally connected to the clamping part (30) by means of the protrusion (51) and said compression spring (52) is arranged to act on the clamping part (30) to urge said clamping part (30) toward said clamping position.

8. The hand-held machine tool as defined in claim 1, wherein said clamping part (30) comprises a clamping disk (60); and said retaining means (28) includes an axially fixed bracket (61) with an elastic retaining part (61b) oriented obliquely relative to the longitudinal axis (11) and a clamping spring (64), and wherein said clamping spring (64) and said clamping disk (60) are arranged to urge said clamping disk (60) against said elastic retaining part (61b).

9. The hand-held machine tool as defined in claim 1, wherein said retaining means (28) includes an axially displaceable part (65) connected with said clamping part (30) to pivot said clamping part from the clamping position into said open position when said axially displaceable part (65) is displaced axially counter to a restoring spring force.

10. The hand-held machine tool as defined in claim 9, wherein said axially displaceable part (65) comprises an actuating sleeve (36) provided with at least one movable push button (54) arranged to cooperate with a blocking face of the tool holder (20), whereby the actuating sleeve (36) is prevented from being displaced axially until after actuation of the push button (54).

11. The hand-held machine tool as defined in claim 1, wherein said tool (16) is selected from the group consisting of a drilling tool, a screwing tool, a brushing tool and a grinding tool.

12. A tool for a hand-held machine tool having a longitudinal axis (11) and comprising a tool shaft (17) and wherein the tool shaft (17) comprises a guiding shaft portion (15) for axially guiding the tool (16), a rotary slaving region (21) for rotary slaving the tool (16) and a retaining shaft portion (24) for axially fixing the tool (16), and wherein the tool shaft (17) has one shaft portion (17a) and another shaft portion (17b), said another shaft portion (17b) having a larger diameter than said one shaft portion (17a), and said retaining shaft portion (24) is arranged in front of the another shaft portion (17b) in an insertion direction of the tool in the hand-held machine tool.

13. A tool for a hand-held machine tool having a longitudinal axis (11) and comprising a tool shaft (17), and wherein the tool shaft (17) comprises a guiding shaft portion (15) for axially guiding the tool (16), a rotary slaving region (21) for rotary slaving of the tool (16) and a retaining shaft portion (24) for axially fixing the tool (16), and wherein the rotary slaving portion (21) is provided with four protrusions (82) distributed over an outer circumference of the tool shaft (17).

14. The tool as defined in claim 12, wherein the retaining shaft portion (24) is predominantly cylindrical with a diameter larger than a diameter of a cross section of the guiding shaft portion (15).

15. The tool as defined in claim 12, wherein the retaining shaft portion (28) is provided with at least one indentation for engagement with at least one retaining protrusion (72,73) provided in a tool holder (20) of the hand-held machine tool.

16. The tool as defined in claim 12, wherein the retaining shaft portion (24) has a cross section that extends at least partially radially beyond a cross section of the rotary slaving region (21).

17. The tool as defined in claim 12, wherein the tool shaft has an adapter (84) detachably connectable with the tool (16).

18. A tool (16) for a hand-held machine tool, said tool having a longitudinal axis (11) about which said tool (16) is rotatably drivable by means of the hand-held machine tool; wherein the tool comprises a tool shaft (17) and the tool shaft (17) comprises a guiding shaft portion (15) for axially guiding the tool (16), a rotary slaving region (21) for rotary slaving of the tool (16) and a retaining shaft portion (24) for axially fixing the tool (16); and wherein the guiding shaft portion (15) and the retaining shaft portion (24) are axially separate from each other and the retaining shaft portion (24) is predominantly cylindrical with a diameter larger than a diameter of the guiding shaft portion (15).

19. The tool as defined in claim 18, wherein the rotary slaving portion (21) is provided with four protrusions (82) distributed over an outer circumference of the tool shaft (17).

20. The tool as defined in claim 18, wherein the retaining shaft portion (28) is provided with at least one indentation for engagement with at least one retaining protrusion (72,73) provided in a tool holder (20) of the hand-held machine tool.

21. The tool as defined in claim 18, wherein the tool shaft (17) has an adapter (84) detachably connectable with the tool (16).

22. A hand-held machine tool and an associated tool (16), wherein said tool (16) comprises a tool shaft (17), said tool shaft (17) comprising a guiding shaft portion (15) and a retaining shaft portion (24):
wherein said machine tool comprises a tool holder (20) having a receptacle (19) including guide means (18) for axially guiding the tool (16) during insertion, the guiding shaft portion (15) of the tool shaft (17) is axially insertable in the receptacle (19) and said tool holder (20) is provided with means for rotary slaving of the tool (16) and with retaining means (28) for axially securing the tool (16), wherein said retaining means (28) are axially in front of said guide means (18) in an insertion direction of the tool (16) in the tool holder (16), are formed for cooperation with the retaining shaft portion (24) of the tool shaft (17); and
wherein the retaining shaft portion (24) is predominantly cylindrical with a diameter larger than a diameter of the guiding shaft portion (15).

23. The hand-held machine tool and an associated tool (16) as defined in claim 22, wherein said retaining means (28) is provided with an opening (31) for passage therethrough of the tool shaft (17) and comprises a clamping part (30) having an open position arranged approximately perpendicular to the longitudinal axis (11) and said clamping part (31) is pivotable out of the open position in a direction toward the longitudinal axis (11) to reduce an effective cross section of said opening and into a clamping position in which the clamping part (30) and the tool (16) are clamped together; and said machine tool has a locking member (34) for locking the clamping part (30) in the open position for insertion or removal of said tool (16).

24. The hand-held machine tool and associated tool as defined in claim 22, wherein the machine tool includes a spindle (12) rotatable about the longitudinal axis (11) and wherein said means for rotary slaving comprises a spindle sleeve (26) having a rear portion (26b) and said rear portion is arranged on the spindle (12) and fixed to prevent rotation of the spindle sleeve (26) relative to the spindle (12).

25. The hand-held machine tool and associated tool as defined in claim 24, wherein said guide means (18) is formed by a guide bore (14) provided in said spindle (12) and said guide bore (14) is coaxial with said spindle (12).

26. The hand-held machine tool and associated tool as defined in claim 22, wherein the clamping part (30) comprises a sheet-metal spring (29) having one end (29a) secured to the tool holder (20) and another end (29b) arranged at an oblique angle to the longitudinal axis (11) and said another end (29b) of the sheet-metal spring (29) is resiliently pre-stressed in a direction toward said clamping position.

27. The hand-held machine tool and associated tool as defined in claim 24, wherein said retaining means (28) includes a compression spring (52) and the clamping part (30) comprises a disk (50), said spindle sleeve (26) has a protrusion (51) and is pivotally connected to the clamping part (30) by means of the protrusion (51) and said compression spring (52) is arranged to act on the clamping part (30) to urge said clamping part (30) toward said clamping position.

28. The hand-held machine tool and associated tool as defined in claim 22, wherein said clamping part (30) comprises a clamping disk (60); and said retaining means (28) includes an axially fixed bracket (61) with an elastic retaining part (61b) oriented obliquely relative to the longitudinal axis (11) and a clamping spring (64), and wherein said clamping spring (64) and said clamping disk (60) are arranged to urge said clamping disk (60) against said elastic retaining part (61b).

29. The hand-held machine tool and associated tool as defined in claim 22, wherein said retaining means (28) includes an axially displaceable part (65) connected with said clamping part (30) to pivot said clamping part from the clamping position into said open position when said axially displaceable part (65) is displaced axially counter to a restoring spring force.

30. The hand-held machine tool and associated tool as defined in claim 29, wherein said axially displaceable part (65) comprises an actuating sleeve (36) provided with at least one movable push button (54) arranged to cooperate with a blocking face of the tool holder (20), whereby the actuating sleeve (36) is prevented from being displaced axially until after actuation of the push button (54).

31. The hand-held machine tool and associated tool as defined in claim 22, wherein said tool (16) is selected from the group consisting of a drilling tool, a screwing tool, a brushing tool an a grinding tool.

* * * * *